Patented Nov. 28, 1950

2,531,756

UNITED STATES PATENT OFFICE 2,531,756

TURKEY BLACKHEAD CONTROL COMPOSITION

Emanuel Waletzky, Stamford, and Harry W. Marson, Greenwich, Conn., assignors to American Cyanamid Company, New York, N. Y., a corporation of Maine No Drawing. Application July 2, 1949,
Serial No. 102,922

7 Claims. (Cl. 167—53.1)

This invention deals with veterinary remedial measures and more particularly, with new compositions and a method for the control of morbidity and mortality in turkeys due to enterohepatitis (blackhead).

Blackhead is recognized as one of the most destructive diseases in turkey husbandry. It is found in every area where turkeys are raised. This disease was one of the prime causes for the shifting of turkey industry from the East to to other sections of the United States.

The disease is considered to be caused by a protozoan organism called *Histomonas meleagridis*. These organisms are discharged in the droppings of the birds and seldom survive more than 24 hours in an unprotected condition. However, they have been found to be harbored in the egg of the common cecal worm *Heterakis gallinae*, and are capable of establishing an infection when the cecal worm egg is ingested by the turkey.

The most common symptoms of blackhead are drooping wings, drowsiness, lowered head, ruffled feathers and yellow-colored diarrhea. However, young birds may die without manifesting any of these symptoms. The mortality in a flock of young birds infected with blackhead may reach as high as 80% to 90%.

In general, with the possible exception of parenteral arsenical administration, which is, of course, uneconomic, the only method of controlling blackhead has been the controlling of the spread of infection. The healthy birds are isolated from the flock, and the disease is allowed to run its course on the infected birds. The diseased birds, by and large, represent a complete loss to the farmer, inasmuch as the mortality rate runs in excess of 90%.

We have found that compounds of the general formula

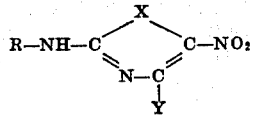

in which X may be the following groups: N=C, C=C, S, $$C=C$$
$$\phantom{C}|\phantom{C}$$
CH₃ (shown as: C=C with CH₃)

R being hydrogen or acyl, and Y equal to hydrogen or a lower alkyl radical, will mitigate the course of the disease and will lead to almost 100% recovery of infected turkeys when administered to the birds within one week of infection.

These compounds have been found to be effective when administered by admixture, suspension or dispersion in the normal elements of sustenance ingested by the turkey. By normal elements of sustenance we include the feed and drink normally partaken by the birds such as grain, mash, scratch, water and/or other liquids.

The general range of concentration of the therapeutic agents in the total sustenance is from 0.01% or less to 1.5%. The optimal concentrations for effective therapy are in the range from 0.02% to 0.2% of the total feed or drinking water. With these optimal concentrations the daily drug intake for infected birds varies from 10 mg. of drug per kg. of body weight, to about 400 mg./kg. These amounts of drug may be administered to advantage in some cases by daily dosing with individual tablets or by drenching or otherwise.

In general, the precise dosage depends on the particular compound and the severity of the infection. The compounds, when administered at the requisite concentrations, show little or no toxic effects, and the nutrition, rate of growth and general well-being is not disturbed.

Test animals which were infected with *Histomonas meleagridis* by administering infected eggs of the cecal worm in amounts which killed more than 90% of the controls, recovered and flourished when these compounds were administered in the requisite amounts at any time after the infection had been established, up to as much as one week after the time of the infection. When the treatment has been delayed, administration should be in the range of the higher concentrations and should continue at these higher concentrations for at least two days. However, in the field, these compounds may effectively be administered as prophylactic long term continuous treatments at the lower concentrations.

The specificity of the compounds which are the subject of this invention will be apparent from a consideration of the table and discussion which follow. The table lists compounds which have been found to be effective and gives a measure of the relative activity. The figure listed under Activity indicates the lowest percentage in the diet affording complete protection.

Table

| Compound | Activity |
|---|---|
| 2-amino-5-nitropyrimidine | 0.05 |
| 2-acetylamino-5-nitropyrimidine | 0.1 |
| 2-amino-5-nitropyridine | 0.1 |
| 2-acetylamino-5-nitropyridine | 0.1 |
| 2-amino-4-methyl-5-nitropyridine | 0.1 |
| 2-amino-5-nitrothiazole | 0.075 |
| 2-acetylamino-5-nitrothiazole | 0.1 |
| 2-amino-4-methyl-5-nitrothiazole | 0.2 |

In contrast to the above, compounds not having the structure represented by the general formula have been found to be completely ineffective and in many instances severely toxic, even though closely related structurally.

By comparison of the effective and ineffective compounds, we find that the nitro group in the indicated position appears to be specific. 2,4,6-triaminopyrimidine, as well as 2-amino-3-nitropyridine and 2-aminothiazole are completely ineffective and moreover, the latter is extremely toxic for the birds as is 2-acetylaminothiazole.

Replacing the 2-amino group by chlorine, mercapto, or nitro radicals renders the compounds ineffective. It should also be mentioned that the benzene analogs are toxic at daily intake levels as low as 15 mg./kg. of body weight.

From consideration of the above comparisons, it becomes apparent that the compounds of this invention when administered by the preferred method at the concentrations recited possess a marked activity against turkey enterohepatitis (blackhead) in contrast to other closely related compounds which are ineffectual, toxic or both.

Although the birds may be given direct individual doses of these compounds by oral administration one or more times a day, the preferred method of treatment and the one which has yielded consistently good results is to allow them to feed ad libitum on the normal diet in which the effective compounds have been mixed or dispersed. Such vehicles of medication should contain enough of the drug so that the dosage ranges indicated above will be ingested in the course of fulfilling the daily food requirements of the bird.

The preferred manner of supplying the compounds of the present invention for administration is to thoroughly disperse the therapeutic material in the birds' feed or drinking water in the concentration ranges indicated below. The higher concentration ranges are for those instances where the compounds are to be mixed with selected portions of the birds' daily rations, i. e., the mash or the water, the concentration being so regulated that the bird will daily ingest 10–400 mgs. of the drug per kg. of body weight.

Under conditions where the probability of infection is extremely high and it is desired to administer the compounds over a long period of time, it has been found effective to administer medicated mash containing 0.01% to 1.0% of these compounds to protect the birds from the deleterious consequences of the infection. Of course, if the infection has already been established, it is preferable to administer the compounds in higher concentrations ranging up to 1.5% by weight of the daily total intake of the sustenance.

These compounds may also be supplied to the turkeys by dissolving or dispersing them in the drinking water or other liquid constituents of the diet such as skim milk, buttermilk or the like.

The drugs are dissolved, suspended or dispersed in liquids in concentrations up to 0.5% by weight. Where the drug is less soluble in the liquid, suspending and/or dispersing agents are used to assure the requisite concentration.

We claim:

1. A composition of matter effective in the control of enterohepatitis which comprises turkey feed and a compound of the group consisting of 2-amino-5-nitropyrimidine, 2-acetylamino-5-nitropyrimidine, 2-amino-5-nitropyridine, 2-acetylamino-5-nitropyridine, 2-amino-4-methyl-5-nitropyridine, 2-amino-5-nitrothiazole, 2-acetylamino-5-nitrothiazole, and 2-amino-4-methyl-5-nitrothiazole.

2. A composition of matter effective in the control of enterohepatitis which comprises turkey feed and from 0.01% to 2.5% by weight of a compound selected from the group consisting of 2-amino-5-nitropyrimidine, 2-acetylamino-5-nitropyrimidine, 2-amino-5-nitropyridine, 2-acetylamino-5-nitropyridine, 2-amino-4-methyl-5-nitropyridine, 2-amino-5-nitrothiazole, 2-acetylamino-5-nitrothiazole, and 2-amino-4-methyl-5-nitrothiazole.

3. A veterinary therapeutic agent for the control of enterohepatitis comprising turkey feed and 2-amino-5-nitrothiazole.

4. A veterinary therapeutic agent for the control of enterohepatitis comprising turkey feed and 2-acetylamino-5-nitrothiazole.

5. A veterinary therapeutic agent for the control of enterohepatitis comprising turkey feed and 2-amino-5-nitropyrimidine.

6. A veterinary therapeutic agent for the control of enterohepatitis comprising turkey feed and 2-amino-5-nitropyridine.

7. A veterinary therapeutic agent for the control of enterohepatitis comprising turkey feed and 2-acetylamino-5-nitropyrimidine.

EMANUEL WALETZKY.
HARRY W. MARSON.

REFERENCES CITED

The following references are of record in the file of this patent:

FOREIGN PATENTS

| Number | Country | Date |
|---|---|---|
| 374,291 | Germany | Apr. 21, 1923 |

OTHER REFERENCES

Chemical Abstracts, vol. 35, page 4380 (1941). (Copy in Scientific Library.)

Hale: Journal of the American Chemical Society, vol. 34 (1912), pages 82, 86, 91, 92. (Copy in Scientific Library.)

Hutyra: Pathology and Therapeutics of the Diseases of Domestic Animals, vol. 2 (1938). (Copy in Division 43.)